United States Patent [19]

Pinckney

[11] Patent Number: 5,026,078
[45] Date of Patent: Jun. 25, 1991

[54] HARP CADDY

[76] Inventor: Kenneth P. Pinckney, P.O. Box 24136, St. Louis, Mo. 63130

[21] Appl. No.: 420,189

[22] Filed: Oct. 12, 1989

[51] Int. Cl.⁵ ............................................. B62B 5/02
[52] U.S. Cl. ................................ 280/5.2; 280/47.131; 280/63; 280/79.11; 280/472; 414/444
[58] Field of Search ................. 280/47.131, 5.2, 79.11, 280/79.2, 79.3, 47.17, 5.28, 47.16, 47.2, 47.13, 47.18, 47.19, 47.28; D17/16, 99; 414/444, 450, 451, 452, 457, 490

[56] References Cited

U.S. PATENT DOCUMENTS

| | | | |
|---|---|---|---|
| 2,736,225 | 2/1956 | Marcus | 280/79.11 |
| 2,786,692 | 3/1957 | Timpson | 280/47.2 |
| 4,781,391 | 11/1988 | Hartwig | 280/5.2 |

OTHER PUBLICATIONS

Author: Harp Specialties Co., Magazine: American Harp Journal (Winter 1988), Title: Harp Transporter System, p. 37.
Author: Harp Specialties Co., Magazine: American Harp Journal (Summer 1989) Title: Harp-Cart p. 39.
Author: Able Services, Title: the Able Assistant, Year 1989.
Author: Lyon & Healy, Title: The Lyon & Healy Letter (vol. 4, No. 1, May 1, 1989).

*Primary Examiner*—Andres Kashnikow
*Assistant Examiner*—Richard Camby
*Attorney, Agent, or Firm*—Senniger, Powers, Leavitt & Roedel

[57] ABSTRACT

A harp caddy for transporting a harp of the type having a base including feet projecting laterally outwardly from the base for supporting the harp. The harp caddy having a frame including a platform for supporting the harp. Clamps attached to the frame are engageable with a portion of the base for clamping the base portion against the platform to secure the harp to the frame. The caddy further includes linkage attached to the frame for operating the clamps for moving the clamps generally downwardly into clamping engagement with the portion of the harp base and for moving the clamps generally upwardly out of clamping engagement with the portion of the harp base. Wheels attached to the frame allow the frame to be rolled across a surface.

22 Claims, 5 Drawing Sheets

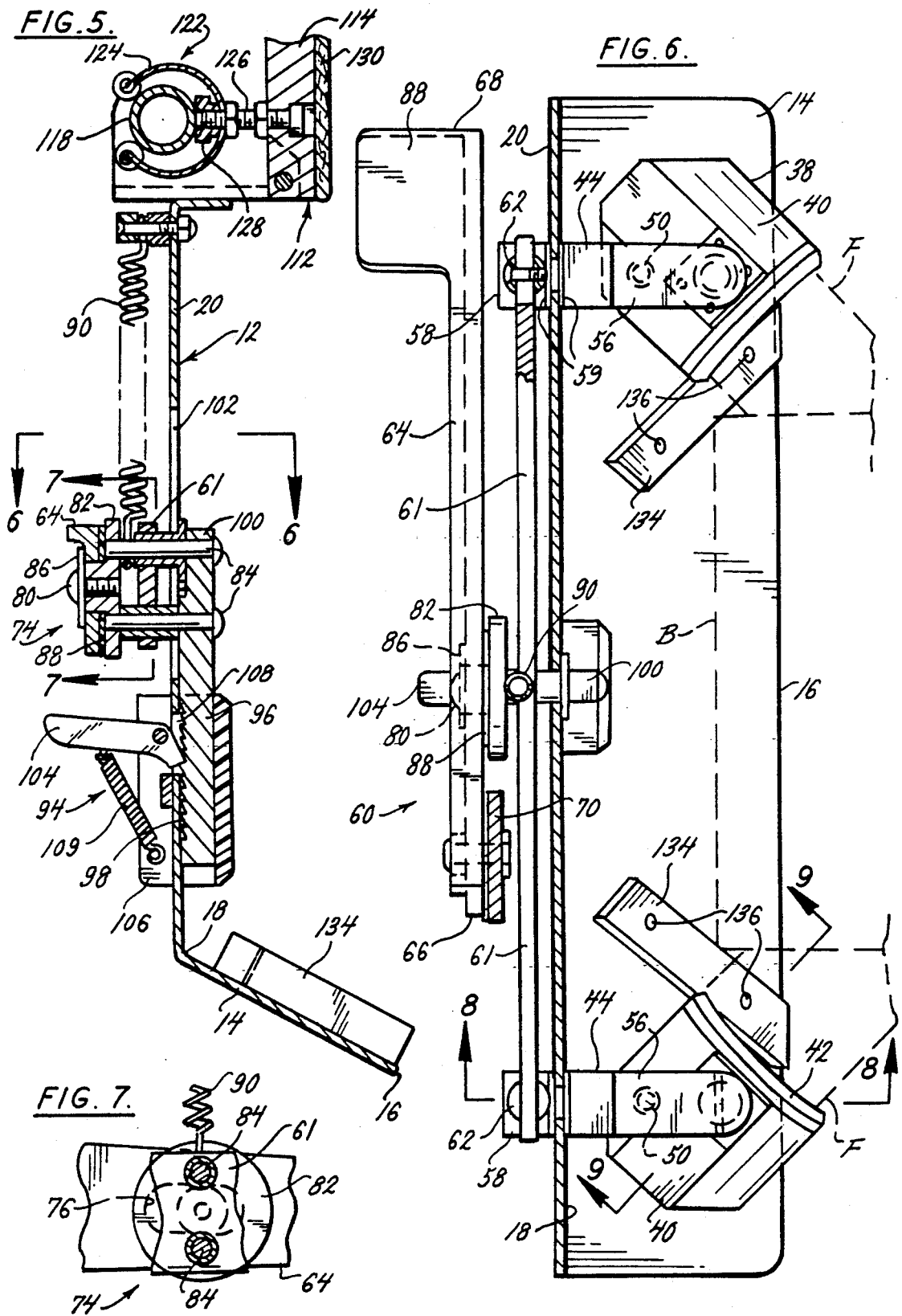

5,026,078

HARP CADDY

BACKGROUND OF THE INVENTION

This invention relates generally to carriers for transporting musical instruments and more particularly to a caddy for a harp.

The size of a harp necessitates use of a wheeled carrier for moving the harp, particularly when the harp is to be moved by a single person. The high cost of harps makes it imperative that the carrier be able to move the harp safely without danger of falling off the carrier. This is particularly a concern when, as is often necessary, the harp must be moved up or down stairs. Moving up or down stairs unavoidably results in bouncing and shifting of the center of gravity of the harp and carrier. To secure the harp on the carrier for transportation, many of the present harp carriers employ straps which must be wrapped around the harp. This requires time and effort on the part of the harpist to prepare the harp for moving. Further, the straps are subject to loosening during transport, particularly when subject to shocks such as those associated with moving the loaded carrier up or down stairs. Even if the straps do not come loose during transport, they do not rigidly fix the harp to the carrier. Therefore, the harp may shift on the carrier during transport which is disconcerting to the owner of such an expensive instrument, even if there is no actual danger of the harp falling off the carrier. It is also noted that the present harp carriers are themselves large so that they also difficult to carry and store when not in use. Therefore, there is presently a need for a harp carrier of compact design on which the harp can be quickly and easily secured for transportation, and which holds the harp relatively rigidly on the carrier to prevent load shifting and give the harp a good feel of security during transportation.

SUMMARY OF THE INVENTION

Among the several objects of this invention will be noted the provision of a harp caddy to which a harp may be quickly secured with a minimum of motion; the provision of such a harp caddy which holds the harp relatively rigidly during transportation; the provision of such a harp caddy which will hold the harp securly thereon although subjected to shocks and shifts in the center of gravity during transportation; the provision of such a harp caddy which is easy to carry when not in use; the provision of such a harp carrier which may be stored in a relatively small place; the provision of such a carrier which will not scratch or mark the harp when transporting it.

Generally, a harp caddy of the present invention is used for transporting a harp of the type having a base with feet projecting laterally outwardly from the base. The harp caddy comprises a frame including a generally horizontally extending platform for supporting the harp feet on the frame. The platform has a front edge and back edge, and a back wall of the frame projects generally upwardly from the back edge of the platform. Clamp means slidably attached to the back wall of the frame can be moved between a first position in which said clamp means is spaced relatively far apart from the platform and a second position in which said clamp means is relatively closer to the platform for clamping the harp feet against the platform to secure the harp to the platform. Wheels attached to the frame allow the frame to be rolled across a surface.

Other objects and features will be in part apparent and in part pointed out hereinafter.

BRIEF DESCRIPTION OF THE DRAWINGS

FIG. 5 is section taken in the plane including line 5—5 of FIG. 4;

FIG. 6 is a section taken in the plane including line 6—6 of FIG. 5;

FIG. 7 is a fragmentary section taken in the plane including line 7—7 of FIG. 5 and showing the connection of the slider bar and pivot bar;

Corresponding reference characters indicate corresponding parts throughout the several views of the drawings.

DETAILED DESCRIPTION OF A PREFERRED EMBODIMENT

Figure 3:
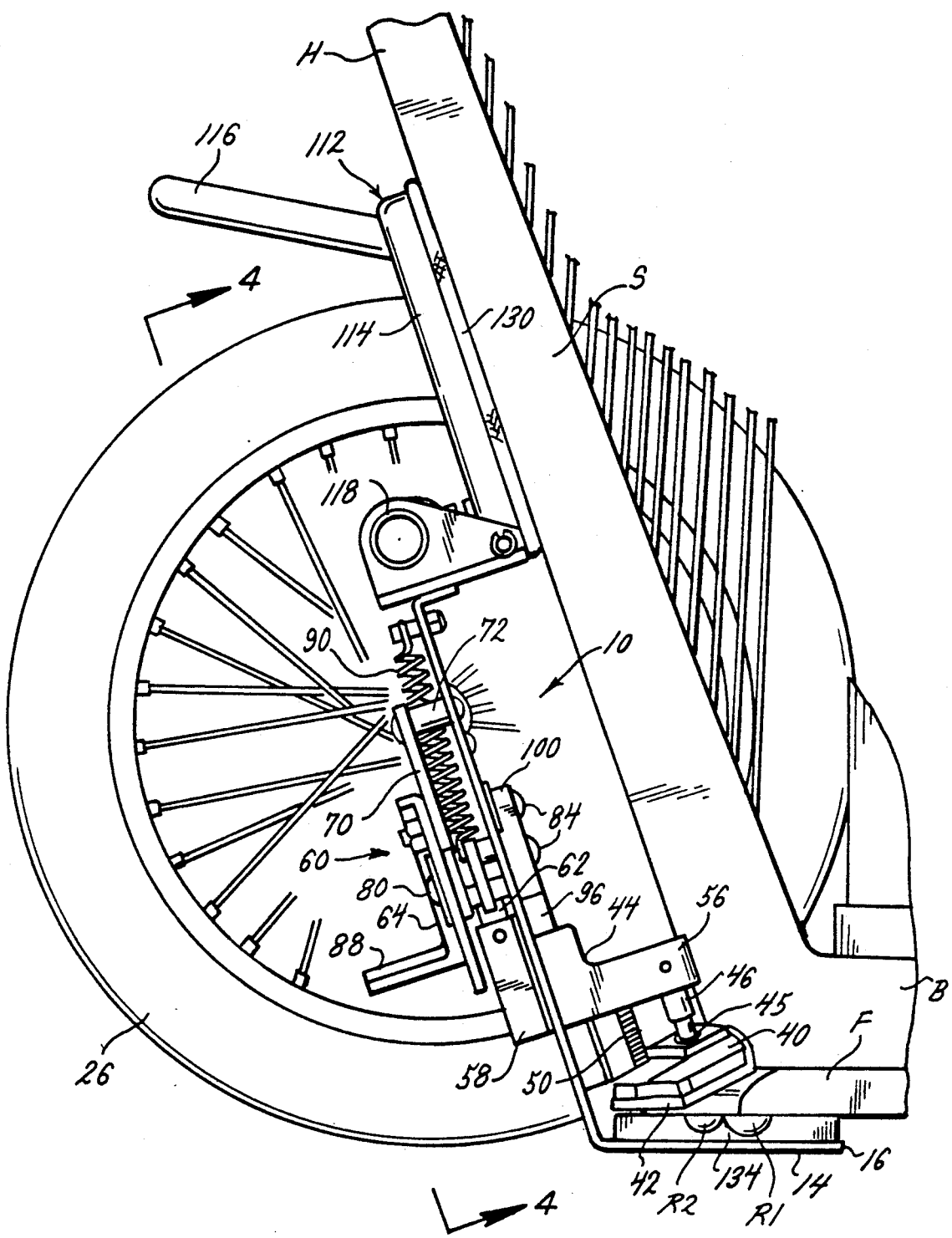
FIG. 3 is a left side view of the harp caddy of FIG. 2 supporting a harp thereon, with a wheel and axle block removed to show detail.

Referring now to the drawings a harp caddy constructed according to the principles of the present invention, generally designated by reference numeral 10, is shown to comprise a frame 12 including a platform 14 for supporting feet F of a harp H on the frame. The harp H is of the type having a base B with the feet F projecting laterally outwardly from the base and superstructure S extending up from the base. As shown in FIG. 3, the harp has a metal rest R1 protruding from the underside of the harp foot F on which the harp is supported when not in use. A rubber rest R2 adjacent the metal rest R1 supports the harp when it is tipped back for playing. The platform 14 has a front edge 16 and a back edge 18, with a back wall 20 of the frame 12 projecting generally upwardly from the back edge 18 of the platform. Clamp means, indicated generally at 22, is slidably attached to the back wall 20 of the frame 12 for movement between a first position in which the clamp means is spaced relatively far apart from the platform and a second position in which the clamp means is relatively closer to the platform. In the second position the clamp means 22 clamps the harp feet F against the platform to secure the harp H to the frame 12. Once clamped to the frame 12 by the clamp means 22, the harp requires no further connection, such as by straps or other devices engaging the superstructure S of the harp H, to secure it to the harp caddy 10.

The harp caddy 10 further comprises wheels 26 for rolling the frame 12 across a surface. The wheels 26 each have an axle 30 received in an axle block 32 mounted on the back wall 20 of the frame 12 by fasteners 34. The wheels are preferably of relatively large diameter to facilitate rolling the harp caddy up or down stairs. In this embodiment, the wheels 26 are sixteen inches in diameter so that they are large enough to negotiate stairs, but not so large as to rub against the harp H carried on the harp caddy 10. It is to be understood that the precise diameter of the wheels is not critical to the invention.

Figure 2:
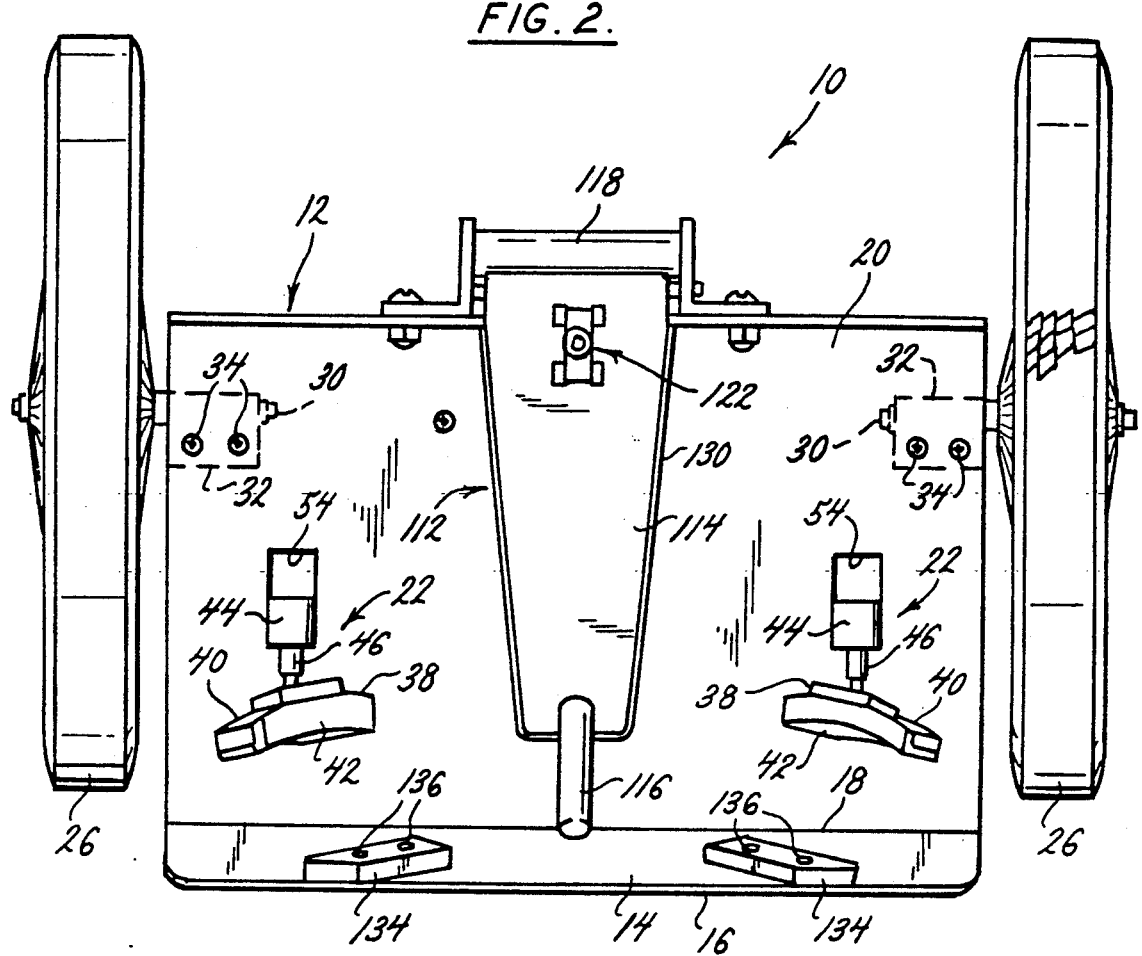
FIG. 2 is a front view of the harp caddy from an angle above the horizontal.
Figure 1:
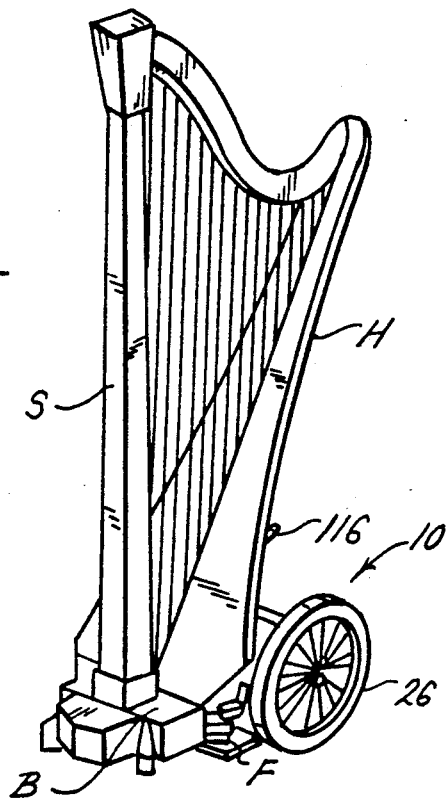
FIG 1 is a perspective of a harp caddy of the present invention supporting a harp thereon.

As illustrated in FIG. 2, the clamp means 22 comprises two clamps 38, each adapted to clamp one of the harp feet F supported on the platform 14 to secure the harp H to the frame 12 (FIG. 3). The clamps 38 each include clamp member 40 and a pad 42 mounted on the underside of the clamp member. The pads 42 are each concave in a direction which, as seen in FIG. 6, is generally parallel to the length of the harp foot F received under a respective clamp 38. The clamp means 22 further includes a bracket 44 for each clamp 38. Each clamp member 40 is attached by a ball-in-socket connection 45 to the distal end of a rod 46 depending from a respective bracket 44 so that the clamp 38 is free to pivot about three mutually perpendicular axes intersecting the distal end of the rod. Therefore, the clamp 38 will reorient itself, upon contact of the pad 42 with the harp foot F, so that the pad is in flush engagement with the harp foot for securely gripping the harp foot.

Springs 50, each located rearwardly of the ball-in-socket connection 45 of a respective rod 46 to each clamp member 40, are connected at one end to the clamp member and at its other end to the bracket 44. The springs 50 limit pivoting of the clamps 38 about the longitudinal axes of the rods 46 so that the directions of the concavity of the pads 42 remain generally aligned with the length of the respective harp foot F. Further the springs 50 maintain the front of the clamps 38 at a greater height than the rear so that the clamps are held in an open position for receiving the harp feet.

Figure 8:
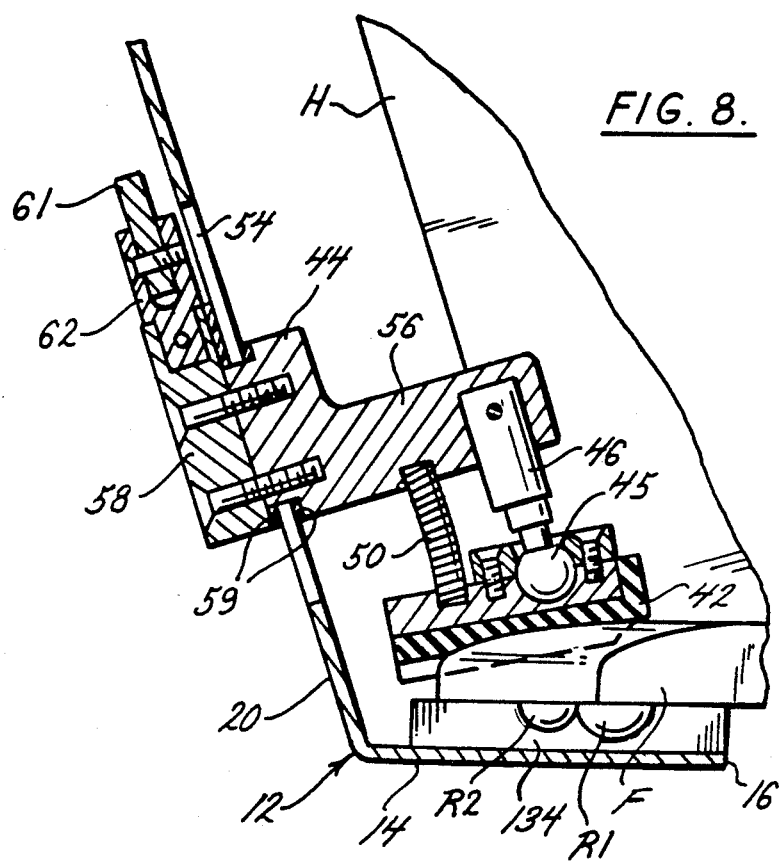
FIG. 8 is a fragmentary section taken in the plane including line 8—8 of FIG. 6.

The back wall 20 of the frame 12 has a pair of spaced apart slots 54 extending generally heightwise of the back wall 20. As shown in FIG. 8, the brackets 44 include front and rear portions, indicated at 56 and 58 respectively. The front portions 56 of each bracket 44 extend through a respective slot 54 in the back wall 20 and are fastened to a respective rear portion 58 for engaging the bracket with the back wall 20 in the slot. Strips of anti-friction material 59 are clamped between the front portion 56 of the bracket 44 and the back wall 20, and the rear portion 58 of the bracket and the back wall to facilitate sliding of the brackets.

Figure 4:
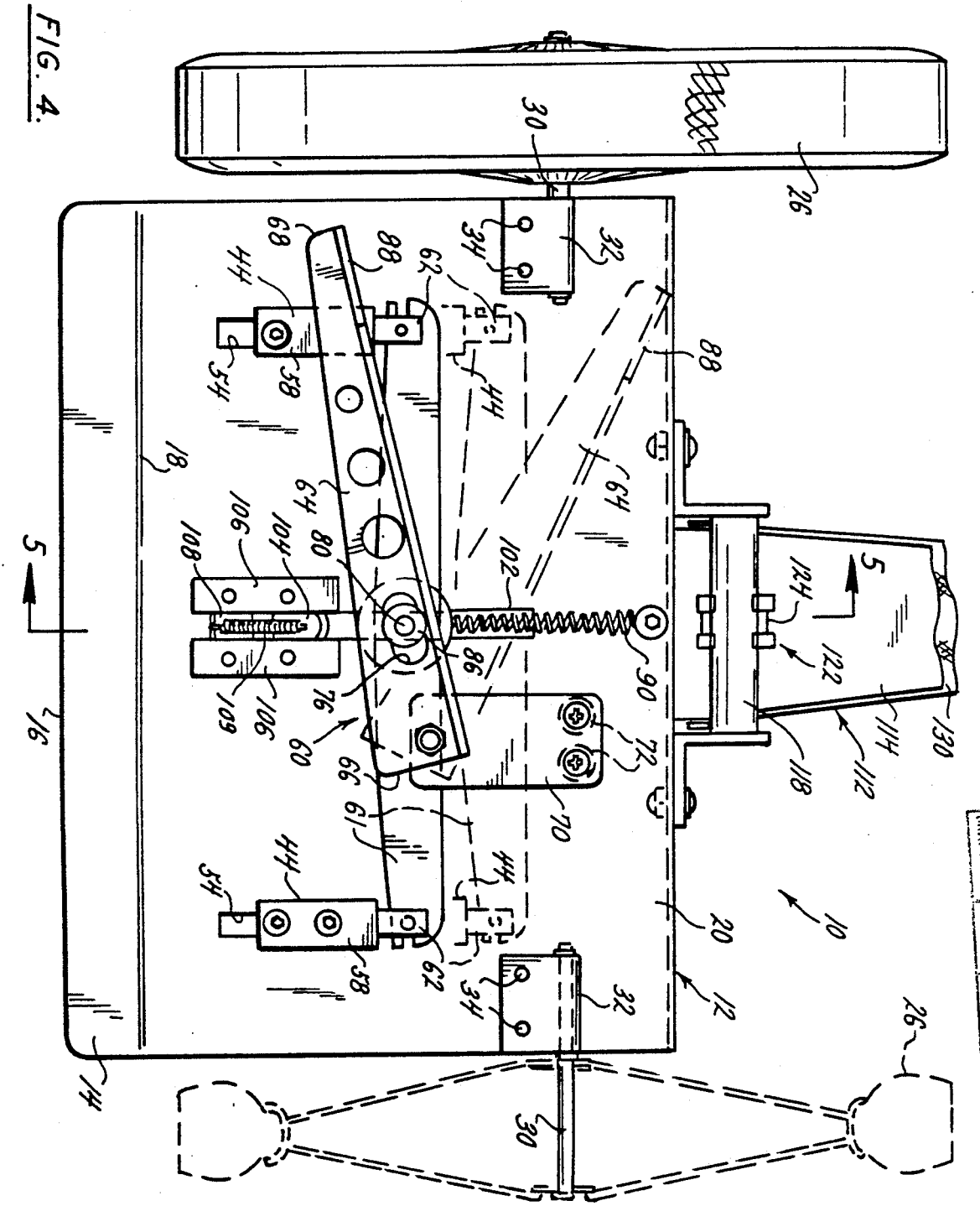
FIG. 4 is a rear view of the harp caddy from the position indicated by line 4—4 of FIG. 3.

A bar linkage, generally indicated at 60, is attached to the back wall 20 of the frame and connected to the rear portions 58 of the brackets 44. The bar linkage 60 is adapted to remotely operate the clamp means 22 for moving the clamps 38 between their first and second positions. As shown in FIG. 4, the bar linkage 60 is located on the rear side of the back wall 20 and comprises a slider bar 61 extending generally in side-to-side direction of the back wall 20 of the frame 12. The slider bar 61 is attached at each end by connecting rods 62 to the rear portions 58 of the clamp brackets 44, and is movable with the brackets and clamps 38 between the stated first and second positions. A pivot bar 64 having first and second ends, indicated at 66 and 68 respectively, is pivotally connected to a plate 70 at its first end 66. The plate 70 is mounted on the back wall 20 of the frame 12 and spaced from the back wall by spacers 72 to provide clearance for the slider bar 61. The pivot bar 64 has a sliding pivoting connection, generally indicated at 74, with the slider bar 61 between the first and second ends 66, 68 of the pivot bar. The connection 74 includes a slot 76 in the pivot bar 64 through which is received a fastener 80 attached to a connecting disk 82 located between the pivot bar and the slider bar and connected to the slider bar 61 by fasteners 84. A washer 86 having a diameter greater than the slot 76 retains the pivot bar 64 on the fastener 80, and a circular piece of anti-friction material 88 between the pivot bar and the disk 82 facilitates the relative sliding motion of the two.

The pivot bar 64 has a pedal 88 at its second end projecting rearwardly of the pivot bar. When the pedal 88 is depressed such that the pivot bar 64 swings about its first end 66, the pivot bar slides and pivots at its connection 74 to the slider bar 61 such that the pivoting motion of the pivot bar is translated to linear motion of the slider bar. As illustrated in FIG. 4, the slider bar 61 moves, upon downward pivoting of the pivot bar 64, from the first position (shown in phantom) in which the clamps 38 are spaced apart from the harp feet F supported on the platform 14, to the second position (shown in solid) in which each clamp is in clamping engagement with a respective harp foot. A spring 90, constituting spring means, is attached to the bar linkage 60 and biases the slider bar 61 toward the first position.

To hold the clamps 38 in clamping engagement with the harp feet F, ratchet means, generally indicated at 94, is provided. As shown in FIG. 5, the ratchet means 94 includes a block 96 having ratchet teeth 98 formed on its back side. The block 96 has an extension 100 at its upper end which is connected to the slider bar 61 and connecting disk 82 by the fasteners 84 which extend from the connecting disk, through the slider bar and a slot 102 in the back wall 20 to the extension. On the rear side of the back wall 20 a catch 104 is pivotally mounted on a pair of blocks 106 mounted to the back wall for pivoting about a generally horizontal axis. The front end of the catch 104 extends through a slot 108 and engages the teeth 98 on the ratchet block 96. In its position shown in FIG. 5, the catch 104 is held against pivoting in the counterclockwise direction. The catch 104, which is engaged with the ratchet teeth 98, thus prohibits motion of the block 96 and slider bar 61 in a first direction toward the first position of the slider bar and clamps 38. However, the catch 104 is pivotable clockwise from its position shown in FIG. 5 to permit motion of the block 96 and the slider bar 61 in a second direction toward the second position of the slider bar and clamps 38. A spring 109 is attached to the catch 104 adjacent the end of the catch opposite the end engaging the ratchet teeth 98 and to the back wall 20 so that the catch will be biased in the counterclockwise direction to ensure that the catch engages the block 96 in each successive recess between adjacent ratchet teeth upon generally downward movement of the block past the catch in the second direction. The clamps 38 may be released from clamping engagement with the harp feet F by pivoting the catch 104 in the clockwise direction until it is disengaged from the ratchet teeth 98. The bias of the spring 90 connected to the top fastener 84 of the bar linkage 60 will pull the slider bar 61 generally upward in the first direction with the clamps 38 releasing the harp feet F so that the harp H may be removed from the harp caddy 10.

The harp caddy 10 has a handle, generally indicated at 112, for maneuvering the caddy such as when it is to be positioned with its platform 14 under a portion of the base B for supporting the harp H on the harp caddy 10. The maneuvering handle 112 includes a body 114 and a grip 116 projecting outwardly from the distal end of the body. The maneuvering handle 112 is pivotally mounted on the frame 12 for movement between a stowed position, as shown in FIG. 2, to a use position, as shown in FIG. 3, in which the maneuvering handle is operable to maneuver the harp caddy 10. A carrying handle 118 is mounted on the top of the back wall 20 of the frame 12 adjacent the base of the maneuvering handle 112. When the harp caddy 10 is not in use and the maneuvering handle 112 is in its stowed position, as illustrated in FIG. 2, the harp caddy may be picked up by the carrying handle 118. Because of the relatively small size and light weight of the harp caddy 10, it is easily transported and requires only a small space for storage.

Means, indicated generally at 122, connected to the maneuvering handle 112 releasably locks the handle in its use position and is operable to adjust the angular orientation of the handle in its use position. As shown in FIG. 5, the means comprises a C-shaped spring clip 124 receivable around the carrying handle 118 when the maneuvering handle is moved to its use position. The spring clip 124 holds the maneuvering handle 112 from accidentally falling back to its stowed position. The clip 124 is connected to the maneuvering handle 112 by a threaded stem 126. An adjustment nut 128 threaded onto the distal end of the stem 126 and located inside the spring clip 124, is engageable with the carrying handle 118 to set an angular orientation of the maneuvering handle 112 in its use position. The angle of orientation may be varied by turning the nut 128 to move it axially inward or outward on the stem 126. The maneuvering handle 112 may thus be properly positioned for to support the back of the lower portion of the harp superstructure S (FIG. 3). The forward facing surface of the body 114 of the maneuvering handle 112 is covered with soft, anti-scratch material 130 to protect the harp H.

Figure 9:
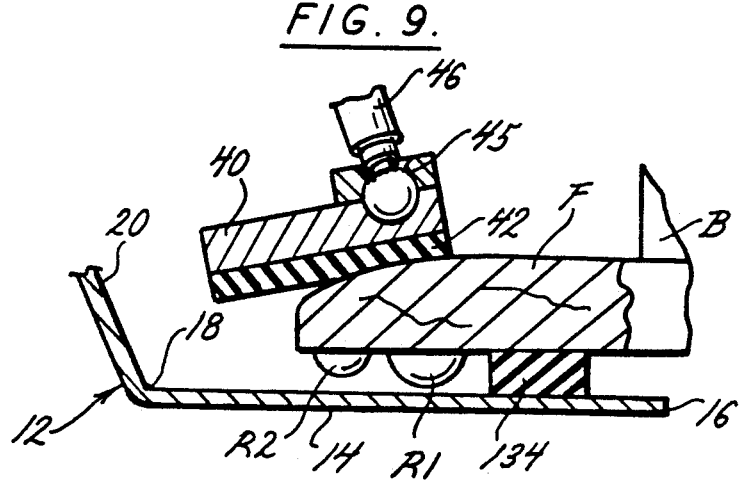
FIG. 9 is a fragmentary section taken in the plane including line 9—9 of FIG. 6.

A first piece of resilient, anti-scratch material 134 (neoprene) for each harp foot F supported on the platform 14 is mounted on the platform 14. Strips of resilient anti-scratch material 134, as illustrated in FIG. 9, hold the rests R1, R2 away from the platform. The neoprene strips 134 engaging the wooden feet of the harp hold them more securely than if the metal rest R1 were supported on the platform 14. Because the material 134 is resilient, the strips 134 are believed to isolate the harp H to some degree from shocks during transportation. Each strip of material 134 is positioned on the platform 14 so that its length is generally perpendicular to the length of the harp foot F supported on it (FIGS. 6 and 9). The length of the strips of material 134 allows for variation in the lateral separation of the harp feet for different models of harps. The strips of material 134 each have a pair of holes 136 in them for receiving the posts of a second strip of resilient, anti-scratch material (not shown). Depending on the particular model of harp, the second strip will be necessary to hold the rests R1, R2 off the platform.

The convenience and other advantages of use of the harp caddy 10 of the present invention are illustrated by the following. At such time it is desired to move the harp H, the harp caddy 10 may be carried from its place of storage by its handle 118 to the harp H. At the harp, the harp caddy is placed on the floor and its maneuvering handle 112 is swung from its stowed position (FIG. 2) to its use position (FIG. 3), with its spring clip 124 locking around the carrying handle 118 to hold the maneuvering handle in its use position (FIG. 5). The maneuvering handle 112 is then operable by grasping its grip 116 to maneuver the harp caddy 10 into position at the rear of the harp H. The harp feet F at the rear of the harp are received on the platform 14 of the caddy by tilting the harp forward slightly and using the maneuvering handle 112 to position the platform 14 under the feet, and then setting the rear end of the harp down onto the platform 14. The harp feet F each rest on a strip of resilient anti-scratch material 134 to protect the harp from damage during transportation on the harp caddy 10. The pedal 88 at the second end 68 of the pivot bar 64 is engageable by the foot of the user to pivot the bar downwardly causing the clamps 38 to move generally downwardly into clamping engagement with respective harp feet. The ratchet means 94 holds the clamps 38 in tight clamping engagement with the harp feet F so that the harp H is secured to the frame 12 with a feel of rigidity as though the harp and caddy were a single unit. The harp may thus be fully secured to the harp caddy while standing only on one side of the harp and without any straps or other securing devices engaging the superstructure S of the harp.

The frame 12 is tilted back on its wheels by grasping the superstructure S of the harp H near its top for rolling the harp caddy 10 across the floor. The back side of the harp superstructure rests against the anti-scratch material 130 on the maneuvering handle 112 so that it does not contact any metal portions of the frame 12 which could scratch the harp. After reaching its destination, the harp H may be released from the frame 12 by pivoting the rear end of the catch 104 upward (counterclockwise as shown in FIG. 5) to disengage it from the ratchet teeth 98. The user may manipulate the catch 104 with her foot so that no bending is required. Once released from the catch 104, the clamps 38 move upwardly because of the bias of the spring 90 connected to the slider bar 61 to release the harp from the frame 12.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A harp caddy for use in transporting a harp of the type having a base with feet projecting laterally outwardly from the base, the harp caddy comprising,
  a frame including a generally horizontally extending platform for supporting the harp feet on the frame, the platform having a front edge and back edge, and a back wall projecting generally upwardly from the back edge of the platform,
  clamp means slidably attached to the back wall of the frame for movement between a first position in which said clamp means is spaced relatively far apart from the platform and a second position in which said clamp means is relatively closer to the platform, said clamp means engaging the harp feet in said second position for clamping the harp feet downwardly against the platform to secure the harp to the frame, and
  wheels attached to the frame for rolling the frame across a surface.

2. A harp caddy for use in transporting a harp of the type having a base with feet projecting laterally outwardly from the base, the harp caddy comprising,
  a frame including a generally horizontally extending platform for supporting the harp feet on the frame, the platform having a front edge and back edge, and a back wall projecting generally upwardly from the back edge of the platform, clamp means slidably attached to the back wall of the frame for movement between a first position in which said clamp means is spaced relatively far apart from the platform and a second position in which the clamp means is relatively closer to the platform for clamping the harp feet against the platform to secure the harp to the frame, bar linkage attached to the back wall of the frame and connected to the clamp means, the bar linkage being adapted to remotely operate said clamp means for moving said clamp means between said first and second positions, and wheels attached to the frame for rolling the frame across a surface.

3. The harp caddy as set forth in claim 2 wherein the bar linkage comprises a slider bar attached to said clamp means and movable with said clamp means between said first and second positions, and a pivot bar having first and second ends, the pivot bar being pivotally connected to the back wall of the frame at its first end and having a pivoting sliding connection with said slider bar between its first and second ends whereby the pivot bar is adapted upon generally downward pivoting of its second end relative its first end to move the slider bar from said first position to said second position.

4. A harp caddy as set forth in claim 3 further comprising spring means connected to the bar linkage for biasing said clamp means toward said first position, and ratchet means for holding said bar linkage against the bias of said spring means and for holding said clamp means in clamping engagement with said harp foot.

5. A harp caddy as set forth in claim 4 wherein said ratchet means comprises a block having ratchet teeth formed thereon connected to said slider bar and a catch mounted on the plate, said catch being engageable with said ratchet teeth for prohibiting motion of the slider bar in a first direction there past toward said first position and for permitting motion of the slider bar in a second direction there past toward said second position, said catch being adapted for disengagement from said ratchet teeth to permit motion of the slider bar in said first direction.

6. A harp caddy as set forth in claim 5 wherein said clamp means comprises a plurality of clamps, each adapted to clamp one of the harp feet supported on the platform, and a bracket for each clamp slidably attached to the back wall of the frame, said clamps being mounted on respective brackets.

7. A harp caddy as set forth in claim 6 wherein each clamp comprises a clamp member and pad mounted on the underside of the clamp member, said clamp member being adapted to pivot about three mutually perpendicular axes with respect to its respective bracket whereby each clamp is reoriented according to the contour of the harp foot upon contact therewith for generally flush engagement of the clamp member pad with the harp foot.

8. A harp caddy as set forth in claim 1 further comprising a first piece of resilient anti-scratch material for each harp foot supported on the platform, each piece of material being mounted on the platform so that each of the harp feet on the platform rests solely upon said piece of anti-scratch material, each piece of material being adapted for attachment of a second piece of resilient anti-scratch material thereto for increasing the thickness of anti-scratch material on the platform.

9. A harp caddy as set forth in claim 1 comprising a handle for maneuvering the harp caddy to position the platform under the harp base, said maneuvering handle being pivotally mounted on the frame for movement between a stowed position and a use position in which said maneuvering handle is operable to maneuver the harp caddy.

10. A harp caddy as set forth in claim 9 wherein said maneuvering handle has means connected thereto for releasably locking said handle in its use position, and for adjusting the angular orientation of said maneuvering handle in said use position.

11. A harp caddy as set forth in claim 1 comprising a handle mounted on the frame to support the harp caddy for transporting the harp caddy.

12. A harp caddy for use in transporting a harp of the type having a base with feet projecting laterally outwardly from the base, the harp caddy comprising, a frame including a generally horizontally extending platform for supporting the harp feet on the frame, the platform having a front edge and back edge, and a back wall projecting generally upwardly from the platform generally adjacent its back edge, a plurality of clamps located generally forward of the back wall, a bracket for each clamp with each clamp being mounted on a respective bracket, the bracket being slidably attached to the back wall of the frame for movement between a first position in which each clamp is spaced relatively far apart from the platform and a second position in which each clamp is relatively closer the platform for clamping a respective harp foot against the platform to secure the harp to the frame, bar linkage attached to the back wall of the frame and connected to the brackets, the bar linkage being adapted to remotely operate the clamps for moving them between said first and second positions, and wheels attached to the frame for rolling the frame across a surface.

13. The harp caddy as set forth in claim 12 wherein the bar linkage comprises a slider bar attached to the brackets and movable with brackets between said first and second positions, and a pivot bar having first and second ends, the pivot bar being pivotally connected to the back wall of the frame at its first end and having a pivoting sliding connection with said slider bar between its first and second ends whereby the pivot bar is adapted upon generally downward pivoting of its second end relative its first end to move the slider bar from said first position to said second position.

14. A harp caddy as set forth in claim 13 further comprising spring means connected to the bar linkage for biasing said clamp means toward said first position, and ratchet means for holding said bar linkage against the bias of said spring means and for holding said clamp means in clamping engagement with said harp foot.

15. A harp caddy as set forth in claim 14 wherein said ratchet means comprises a block having ratchet teeth formed thereon connected to said slider bar and a catch mounted on the plate, said catch being engageable with said ratchet teeth for prohibiting motion of the slider bar in a first direction there past toward said first position and for permitting motion of the slider bar in a second direction there past toward said second position, said catch being adapted for disengagement from said ratchet teeth to permit motion of the slider bar in said first direction.

16. A harp caddy as set forth in claim 12 wherein each clamp comprises a clamp member and pad mounted on the underside of the clamp member, said clamp member being adapted to pivot about three mutually perpendicular axes with respect to its respective bracket whereby each clamp is reoriented according to the contour of the harp foot upon contact therewith for generally flush engagement of the clamp member pad with the harp foot.

17. A harp caddy as set forth in claim 12 further comprising a first piece of resilient anti-scratch material for each harp foot supported on the platform of the frame, each piece of material being mounted on the platform so that each of the harp feet on the platform rests solely upon said piece of anti-scratch material, each piece of material being adapted for attachment of a second piece of resilient anti-scratch material thereto for increasing the thickness of anti-scratch material on the platform.

18. A harp caddy as set forth in claim 12 comprising a handle for maneuvering the harp caddy to position the platform under the harp base, said maneuvering handle being pivotally mounted on the frame for movement between a stowed position and a use position in which said maneuvering handle is operable to maneuver the harp caddy.

19. A harp caddy as set forth in claim 18 wherein said maneuvering handle has means connected thereto for releasably locking said handle in its use position, and for adjusting the angular orientation of said maneuvering handle in said use position.

20. A harp caddy as set forth in claim 12 comprising a handle mounted on the frame to support the harp caddy for transporting the harp caddy.

21. A harp caddy for use in transporting a harp, the harp caddy comprising, a frame including a generally horizontally extending platform for supporting the harp on the frame, the platform having a front edge and a back edge, and a back wall projecting generally upwardly from the rear edge of the platform, clamps connected to the back wall of the frame for sliding movement with respect to the frame in a generally vertical plane adjacent the back edge of the platform between a first position in which the clamps are spaced relatively far apart from the platform and a second position in which the clamps are relatively closer to the platform, the clamps engaging the harp in said second position for clamping the harp downwardly against the platform to secure the harp to the frame, and wheels attached to the frame for rolling the frame across a surface.

22. A harp caddy for use in transporting a harp, the harp caddy comprising, a frame including a generally horizontally extending platform for supporting the harp on the frame, the platform having a front edge and a back edge, clamp means connected to the frame for movement with respect to the frame in a generally vertical plane adjacent the back edge of the platform between a first position in which said clamp means are spaced relatively far apart from the platform and a second position in which said clamp means are relatively closer to the platform, said clamp means engaging the harp in said second position for clamping the harp downwardly against the platform to secure the harp to the frame, wheels attached to the frame for rolling the frame across a surface, and spring means attached to the frame and connected to said clamp means for biasing said clamp means toward said first position, and means for holding said clamp means in said second position against the bias of said spring means.

* * * * *